Patented Oct. 23, 1945

2,387,284

UNITED STATES PATENT OFFICE 2,387,284

INHIBITOR FOR CARBON TETRACHLORIDE

Edward O. Ohlmann, Ann Arbor, Mich., assignor to The Dow Chemical Company, Midland, Mich., a corporation of Michigan No Drawing. Application February 12, 1943, Serial No. 475,694

6 Claims. (Cl. 260—652.5)

The present invention is directed to a method for preventing the corrosion of metals in contact with carbon tetrachloride and to an inhibited carbon tetrachloride composition.

Carbon tetrachloride and other chlorinated hydrocarbon solvents frequently contain small amounts of water, and in such condition have been found to corrode metal surfaces. This action takes place at such a rate as seriously to interfere with the use of such solvents in fire extinguishers and metal degreasing and dry cleaning apparatus. Similarly, such corrosive properties constitute a problem with respect to the transportation and/or storage of chloro-hydrocarbons in metal tanks, drums, cans, etc. The net results of such corrosion of metal surfaces are the contamination of the chloro-hydrocarbon and weakening and eventual destruction of the apparatus or container concerned.

In efforts to prevent or at least control the rate of corrosion, carbon tetrachloride and other chlorinated solvents have been modified with a variety of inhibitors and stabilizers. Representative of the materials so employed have been inorganic alkalies, rosin, benzaldehyde, cyclohexane, petroleum oil fractions, toluene, amines, and phenols. While all of the foregoing exhibit some stabilizing or inhibiting effect under certain conditions, none is adapted to be employed in small concentration to accomplish the inhibition for a substantial time of the corrosion by carbon tetrachloride of metal surfaces, particularly if water or moisture is present.

According to the present invention, a method is supplied for inhibiting the corrosion of metals by carbon tetrachloride including the step of dispersing relatively small amounts of rosin and of a primary mono-amine in the carbon tetrachloride. An improved carbon tetrachloride composition is thereby obtained which, although contacted with metals in the presence of water for long periods, causes but a small percentage of the corrosion ordinarily resulting from similar contact with wet carbon tetrachloride alone or inhibited compositions comprising conventional stabilizing agents. While rosin and the primary mono-amines have hitherto separately been employed in carbon tetrachloride in attempts to accomplish a similar result, a composition containing the combination of the two has been found to have anti-corrosion properties which, measured in terms of weight loss of metal and of duration of effect, are much greater than additive with respect to the results obtained with either constituent alone.

The present invention is accomplished by dissolving or otherwise dispersing the desired amounts of rosin and primary mono-amine in carbon tetrachloride. This may be accomplished by successively adding the amine and finely divided rosin to the carbon tetrachloride with stirring. An alternate procedure includes mixing and warming the amine and rosin together prior to introduction into the carbon tetrachloride so as to form an inhibitor concentrate adapted to be employed with carbon tetrachloride in such quantity as to impart the desired anti-corrosion properties.

The amounts of rosin and amine so employed may vary widely, a degree of corrosion inhibition being exhibited by carbon tetrachloride modified therewith regardless of the exact proportions of the additaments. In actual practice, however, best results are obtained when rosin is present in the carbon tetrachloride in the amount from 0.1 to 1.0 per cent by weight or more and primary mono-amine within the range of 0.001 and 0.1 per cent by weight. When lesser amounts than the foregoing are employed, the duration of corrosion inhibition is relatively short, and if greater amounts of amine are included in the composition, there is a tendency for odoriferous deposits to be formed on metal surfaces contacted therewith. A convenient mode of operation includes maintaining dispersed in the carbon tetrachloride amounts of rosin and of primary mono-amine in excess of those soluble in the water present in the system and/or required to protect the metal in immediate contact with the carbon tetrachloride composition. By operating in this fashion, amounts of inhibitor deposited on metal surfaces and subsequently removed from contact with the carbon tetrachloride or removed by separation of water, do not bring about the reduction of the inhibitor content to below that required to prevent corrosion.

As regards the rosin, it has been observed that a finely divided product, and preferably one which has been exposed to the air and light for an appreciable period of time, is most satisfactory. It would appear that the oxidation product formed on the surfaces of the rosin particles is extremely active as an inhibitor in the presence of the amine. The preferred amine is aniline, although other primary aromatic and aliphatic monoamines are operable.

The expression "relatively small amount" as herein employed with respect to the rosin and amine present in the carbon tetrachloride composition, refers to amounts not in excess of 1 per cent by weight and preferably those within the ranges indicated in the foregoing paragraphs.

The inhibited composition as described is particularly effective in minimizing the corrosion of copper surfaces contacted therewith. It is to be understood, however, that the corrosion of other metallic surfaces such as brass, iron, lead, tin, monel, and various iron and steel alloys by wet carbon tetrachloride is similarly controlled when the combination of rosin and amine is employed in the carbon tetrachloride composition.

The following examples illustrate the invention but are not to be construed as limiting:

EXAMPLE 1

A number of compositions were prepared in which various amounts of rosin, of aniline, and of rosin and aniline were dispersed in carbon tetrachloride. Each of these compositions was tested to determine corrosion against copper surfaces by suspending copper strips 2.5 inches long, 0.5 inch wide, and 0.125 inch thick in a glass flask containing 50 milliliters of the modified carbon tetrachloride and 30 milliliters of water. The strips were so positioned that one-third of each was in the carbon tetrachloride, one-third in the water, and one-third above the liquid in the flask. Each such flask was equipped with a reflux condenser. Each flask and contents was then heated to boiling temperature and the copper strips examined and weighed at regular intervals to ascertain the degree of corrosion resulting. Prior to weighing, the strips were washed and wiped clean with a soft cloth. After ten days of refluxing, it was found that carbon tetrachloride containing 0.01 per cent by weight of aniline had caused a weight loss of 3212 milligrams per square inch of surface of the copper strips. Over a similar period, copper strips suspended in the carbon tetrachloride containing 0.1 per cent by weight of rosin showed a weight loss of 30.3 milligrams per square inch of surface. Copper strips contacted with the composition containing 0.1 per cent of rosin and 0.01 per cent aniline, showed a weight loss of but 11.8 milligrams per square inch.

A series of determinations in which the copper strips were removed from the water-carbon tetrachloride mixture and wiped and weighed at 48-hour intervals gave the following results:

*Table 1*

| Percent by weight of rosin | Percent by weight of aniline | Weight loss of copper strips at 2-day intervals in milligrams per square inch surface | | | |
|---|---|---|---|---|---|
| | | 2 days | 4 days | 6 days | 8 days |
| 0 | 0 | 698 | 1,903 | 1,819 | 828 |
| 0 | 0.01 | 1,370 | 1,290 | 1,305 | 1,860 |
| 0.1 | 0 | 7.1 | 1,670 | 655 | 455 |
| 0.1 | 0.01 | 5.5 | 3.6 | 6.5 | 5.2 |

EXAMPLE 2

In a similar fashion, other metals were substituted for copper and contacted with carbon tetrachloride containing varying amounts of rosin and aniline in the presence of water. The following table sets forth representative data as obtained in this determination:

*Table 2*

| Percent by weight of rosin | Percent by weight of aniline | Metal | Weight loss of metal strips at 2-day intervals in milligrams per square inch surface | | | | | Average milligrams per square inch lost during each 48-hour period |
|---|---|---|---|---|---|---|---|---|
| | | | 2 days | 4 days | 6 days | 8 days | 10 days | |
| 0.5 | 0 | Brass | 4.2 | 22 | 121 | 155 | 259 | 112 |
| 0.5 | 0.1 | ...do... | 4.2 | 2.3 | 3.3 | 2.1 | 4.4 | 3.4 |
| 0 | 0 | Iron | 344 | 231 | 311 | 289 | 288 | 293 |
| 0.5 | 0.1 | ...do... | 44 | 57 | 64 | 48 | 37 | 56 |
| 0.5 | 0 | Lead | 51 | 27.6 | 21.2 | 31.5 | 23.7 | 31.1 |
| 0.1 | 0.01 | ...do... | 8.5 | 12.9 | 15.5 | 11.0 | 8.3 | 11.2 |
| 0 | 0 | Tin | 1.1 | 1.0 | 1.4 | 1.4 | 1.5 | 1.3 |
| 0.5 | 0.1 | ...do... | 0.8 | 1.0 | 1.0 | 0.6 | 1.0 | 0.8 |
| 0.1 | 0.01 | ...do... | 0.7 | 0.7 | 0.7 | 0.6 | 1.0 | 0.7 |
| 0 | 0 | Monel | 3.0 | 312 | 468 | 341 | 340 | 291 |
| 0.5 | 0 | ...do... | 1.0 | 1.3 | 1.3 | 1.6 | 2.7 | 1.6 |
| 0.5 | 0.1 | ...do... | 0.4 | 0.4 | 0.3 | 0 | 0.3 | 0.26 |
| 0 | 0 | Stainless steel | 0.2 | 0.1 | 0.8 | 14.6 | 9.3 | 5.0 |
| 0.1 | 0.01 | ...do... | 0.1 | 0.4 | 0.2 | 0 | 0.1 | 0.07 |
| 0 | 0 | Galvanized iron | 8.7 | 18.4 | 20.8 | 51.6 | 89.3 | 37.8 |
| 0.1 | 0.01 | ...do... | 11.1 | 17.6 | 11.8 | 12.6 | 16.2 | 13.8 |
| 0 | 0 | Cast "Everdur" | 1,165 | 1,122 | 843 | [1]1,061 | | 1,025 |
| 0.5 | 0 | ...do... | 7.2 | 1,182 | [1]1,110 | | | 766 |
| 0.5 | 0.1 | ...do... | 3.5 | 11.6 | 3.5 | | | 6.2 |

[1] Metal strips corroded through.

EXAMPLE 3

Likewise, a number of representative primary monoamines were substituted for aniline in mixture with rosin and carbon tetrachloride. Here again copper strips were employed in contact with a hot mixture of water and the various carbon tetrachloride compositions. The following data is representative of that obtained:

Table 3

| Percent by weight of rosin | Percent by weight of amine | Nature of amine | Weight loss of copper strips at 2-day intervals in milligrams per square inch of surface | | | |
|---|---|---|---|---|---|---|
| | | | 2 days | 4 days | 6 days | 8 days |
| 0.5 | 0.1 | N-butyl-amine | 13.1 | 16.2 | 4.6 | 5.8 |
| 0.5 | 0.1 | Para-anisidine | 6.7 | 4.7 | 9.0 | 6.0 |
| 0.5 | 0.1 | Isoamylamine | 12.3 | 3.6 | 3.7 | 3.6 |
| 0.5 | 0.1 | Mono-ethanolamine | 3.2 | 1.9 | 1.9 | 3.2 |

Other primary mono-amines may be employed in combination with rosin to accomplish the procedure of the present invention and to obtain the desired carbon tetrachloride compositions. Representative of such compounds are allyl-amine, normal-propyl-amine, pentenyl-amine, normal-hexyl-amine, normal-octyl-amine, normal-dodecyl-amine, hexadecenyl-amine, para-ethyl-aniline, 4-tertiary-butyl-aniline, 2,4-dimethyl-aniline, ortho-toluidine, para-toluidine, 4-amino-diphenyl, mono-cyclohexyl-amine, mono-isopropanol-amine, glycine ethylester, benzyl-amine, etc.

I claim:

1. A method of inhibiting the corrosion of metals by carbon tetrachloride in contact therewith, which comprises dissolving in the carbon tetrachloride at least 0.1 per cent by weight of rosin and from 0.001 to 0.1 per cent by weight of aniline.

2. A method of inhibiting the corrosion of metals by wet carbon tetrachloride in contact therewith, which comprises dissolving in the carbon tetrachloride at least 0.1 per cent by weight of rosin and from 0.001 to 0.1 per cent by weight of a primary mono-amine.

3. A composition of matter comprising carbon tetrachloride containing at least 0.1 per cent by weight of rosin and from 0.001 to 0.1 per cent by weight of a primary mono-amine.

4. A composition of matter comprising carbon tetrachloride containing between 0.1 and 1.0 per cent by weight of rosin and from 0.001 to 0.1 per cent by weight of aniline.

5. A method of inhibiting the corrosion of metals by wet carbon tetrachloride in contact therewith which comprises dissolving in the carbon tetrachloride at least 0.1 percent by weight of rosin and at least 0.001 percent by weight of a primary mono-amine.

6. A composition of matter comprising carbon tetrachloride having dissolved therein at least 0.1 percent by weight of rosin and at least 0.001 percent by weight of a primary mono-amine.

EDWARD O. OHLMANN.